United States Patent
Cheung (10) Patent No.: US 7,578,254 B2
(45) Date of Patent: *Aug. 25, 2009

(54) SPORTS BOARD WITH INTEGRAL LAMINATED STIFFENING ELEMENT

(76) Inventor: Wah Kan Cheung, 55 Doncaster Ave., Suite 102, Thronhill, Ontario (CA) L3T 1L7

( * ) Notice: Subject to any disclaimer, the term of this patent is extended or adjusted under 35 U.S.C. 154(b) by 200 days.

This patent is subject to a terminal disclaimer.

(21) Appl. No.: 11/818,372

(22) Filed: Jun. 14, 2007

(65) Prior Publication Data

US 2007/0243780 A1    Oct. 18, 2007

Related U.S. Application Data

(63) Continuation-in-part of application No. 11/368,106, filed on Mar. 3, 2006, now Pat. No. 7,246,568.

(51) Int. Cl.
    *B63B 5/24* (2006.01)
(52) U.S. Cl. ...................................... 114/357
(58) Field of Classification Search .................. 114/357
    See application file for complete search history.

(56) References Cited

U.S. PATENT DOCUMENTS

| 5,489,228 A * | 2/1996 | Richardson et al. ........... 441/74 |
| 5,944,570 A * | 8/1999 | Appleby ....................... 441/65 |
| 7,029,349 B2 * | 4/2006 | Lin .............................. 441/65 |

* cited by examiner

*Primary Examiner*—Stephen Avila
(74) *Attorney, Agent, or Firm*—Clement Cheng (57) ABSTRACT

A sport board for snow sledding or surf body boarding comprises a multi-layered laminated composite foam core coupled with stiffening elements for mechanical strengthening of the board. The composite foam core comprises laminates of polyolefin foam base and stiffening elements composed of substantially polymer foam and has substantial higher compressive strength and flexural strength than the foam base. A front section may be made of the same blank material as the low density polyolefin foam base and is bonded to the front end of the foam core complex to give a full frontal flexibility for a higher directional control by the rider and improved shock absorbing property. Polyethylene foam sheets wrap the foam core complex subassembly and head section for sled integrity and graphic film finishes the sled top, the bottom is also finished with a polyethylene sheet for slickness.

27 Claims, 8 Drawing Sheets

SPORTS BOARD WITH INTEGRAL LAMINATED STIFFENING ELEMENT

This application is a continuation in part of application Ser. No. 11/368,106 filed Mar. 3, 2006 now U.S. Pat. No. 7,246,568 by inventor Wah Kan Cheung entitled Sports Board with Integral Laminated Stiffening Element, the disclosure of which is incorporated herein by reference.

BACKGROUND OF THE INVENTION

A. Field of the Invention

The present invention relates generally to sports boards, and more particularly to polyethylene based composite foam boards for gliding on snow or water having a stiffening element coupled to the core for mechanical strengthening of the board. The present invention relates to stiffening elements composed of substantially polymer foam that may be placed in selected positions to selectively increase rigidity to selected portions of a foam board. With controlled placement of stiffening element(s), the foam board can be adapted to have higher stiffness in a first portion and greater flexibility in a second portion of the board.

B. Description of the Prior Art

Body boards and snow gliding boards are typically made of a polyolefin foam that imparts some flexibility and resiliency during gliding. Polyethylene foam sports boards have recently become very popular, in particular as snow sleds, bodyboards and other kinds of gliding boards. However, one drawback in using a polyethylene foam sports board is that it does not have the desirable stiffness against the flex of the foam board caused by the weight of the rider and this impairs the maneuverability of the sports board. For example, in the application of snow sled, such deformation of the board will result in the foam sled submerging below the snow surface and thereby reduce the sliding speed and directional stability when carrying a rider sliding down a snow-covered slope. It is obviously more desirable to have a foam sled or a bodyboard having higher flexural strength.

Some prior arts apply a polyethylene foam core of higher stiffness by increasing the thickness or density of foam core, or by laminating a thick polymer film outside the foam board. Yet this increases the weight of foam board degrading desirable performance in its applications as a snow sled or bodyboard. It would be desirable to provide a method to make a polyethylene foam sports board at a lower density and less weight but with sufficient stiffness to support a rider to perform the intended function on the sports board. Also desirable is to provide a method to make a foam sports board that has high flexural strength at relatively low cost.

Expanded polystyrene (EPS) or polystyrene foam core has been used to produce foam sports boards due to its lightweight and rigid properties. However, there are some drawbacks associated with a polystyrene foam core. For example, for a snow sled, a polystyrene foam core does not provide the same degree of comfort in terms of cushioning and shock absorption properties compared to a polyethylene foam core. In addition, the polystyrene foam is poor in elastic recovery under even minor impact forces, and may form undesirable indentations such as in the front portion of a snow sled. It may be desirable to develop a foam core that has the structural stiffness advantages of a polystyrene foam core in the main body and the desirable resilient and shock absorption properties of polyethylene foam in the top and front portion of the board.

One typical method of strengthening bodyboard is to insert one or more cylindrical rods, know as stringers, into holes drilled parallel to the longitudinal axis of the board from the tail end toward the nose end. A stringer system would generally include a fiberglass or graphite rod that is centrally inserted and adhesively secured in the foam core material. The disadvantage of the current stringer systems used is that the stringer may separate from the foam core after frequent use. It would be desirable to provide a method of inserting a stiffening element by heat laminating it to the foam core so that a strong bond forms between stiffening element and the foam core.

Typically, in use, the rider of a bodyboard grips the front edge close to one corner of the lead nose and front portion of the side edge of the bodyboard. The hand in the front edge plays a significant role in steering control and maneuvering the bodyboard. Successful completion of maneuvers requires the bodyboard to respond adequately to the rider's steering. Force applied to the bodyboard that only distorts the board does not help the rider in redirecting the board. Thus, a high degree of stiffness of the bodyboard is desirable. However, it may not be desirable to make the bodyboard very rigid entirely from the nose to the tail. For example, it may be desirable for the board to be more flexible at the portion between a transverse line about a quarter of the way from the nose and the lead nose. Such flexibility allows the rider to pull up the nose of board and keep the nose and lead corners from dropping under the water's surface in a dynamic situation where the nose is being forced downwardly. However, in the forward quarter of the board, it is generally considered desirable for the board to be very stiff along a transverse line so that the rider's steering inputs on one side of the board will effectively be transmitted to the opposite side of the board and redirect the opposite side. It is therefore more desirable to provide an improved foam core with stiffening element adapted to increase the stiffness of a selected portion of the board. It is also desirable to provide an improved foam core with stiffening element adapted to provide the resistance to flex along a transverse axis and yet allow adequate flexibility along a longitudinal axis of the foam core in the forward quarter of the board.

The necessary condition to provide stiffening to a composite foam core is that the flexural strength of the coupled stiffening element has to be substantially higher than that of the low density base foam core. It is apparent that when applying polystyrene foam plate as the stiffening element to a polyolefin foam base core, the polystyrene foam plate contributes higher flexural strength and a stiffening effect.

It is yet another object of the invention to provide an improved foam board having a polyethylene foam core coupled with stiffening element adapted to increase the stiffness of a selected portion of the board.

It is yet another object of the invention to provide an improved foam core that has the structure stiffness advantages of a polystyrene foam core in the main body and the desirable resilient and shock absorption properties of polyethylene foam in the top and front portion of the board.

It is yet another object of the invention to provide an improved bodyboard with stiffening element adapted to provide the resistance to flex along a transverse axis and yet allow adequate flexibility along a longitudinal axis of the foam core in the forward quarter of the board.

SUMMARY OF THE INVENTION

The present invention provides the solution to the above-mentioned problem by introducing generally planar stiffening element composed of substantially polymer foam into a low density polyolefin foam base, forming a composite foam core. The stiffening element has substantial higher compressive strength and flexural strength than the foam core. The sport board according to the present invention may be constructed as a foam sled to ride on at snow-covered slopes or a bodyboard for body surfing on waves.

The composite polyolefin foam core in accordance with the invention comprises a polystyrene foam plate laminated to a polyethylene foam plate. Polyolefin foam may comprise a polyolefin polymer, such as homopolymer or copolymer of polyethylene and homopolymer or copolymer of polypropylene, more preferable a low density polyethylene foam.

The polystyrene foam plate is laminated to the low density polyolefin foam plate with substantially planar bonding surface through the use of a heat activated adhesive resin layer. The polystyrene foam plate may be a pure styrene foam or it may be a hybrid foam of styrene and ethylene or other compatible polymer such as ethylene vinyl acetate. In one aspect of the invention, the bonding surfaces are oriented in a direction generally parallel to the X-Y plane of the core. In another aspect, the bonding surfaces are oriented in a direction generally parallel to the X-Z plane of the core. In one embodiment the sports board includes a composite foam core consisting of a first core section of polyolefin foam, and a second core section of polystyrene foam, a bottom plastic layer, and a top plastic layer.

The stiffening element may extend throughout the length of the sports board to provide an even stiffness to the board. Alternative, the stiffening element may selectively be applied to the rider supporting section of the board to provide a high compression resistance and flexural strength against the rider's weight. A front section of low density polyolefin foam may be bonded to the front end of the foam core complex to give a full frontal flexibility. A rear section of low density polyolefin foam may also be bonded to the rear end of the foam core complex if desirable. The resulting sports board with a flexible front section and a rigid supporting main body is particularly useful in the application of both snow sled and bodyboard. The stiffening elements provide the board with improved rigidity, allowing improved maneuvering of a bodyboard and higher sliding speed for a snow sled. It is particularly useful that the flexibility near the front quarter length of a bodyboard provides desirable flex to a rider to manipulate directional steering during wave surfing. In the snow sled application, the flexible front section provides desirable resilient and shock absorbing properties to the board, in particular for front impact.

BRIEF DESCRIPTION OF THE DRAWINGS

Each of the different embodiments shows a board having different construction and different handling characteristics. Similar elements are referred to by common call out numbers.

DETAILED DESCRIPTION OF THE PREFERRED EMBODIMENT

Construction

Figure 1:
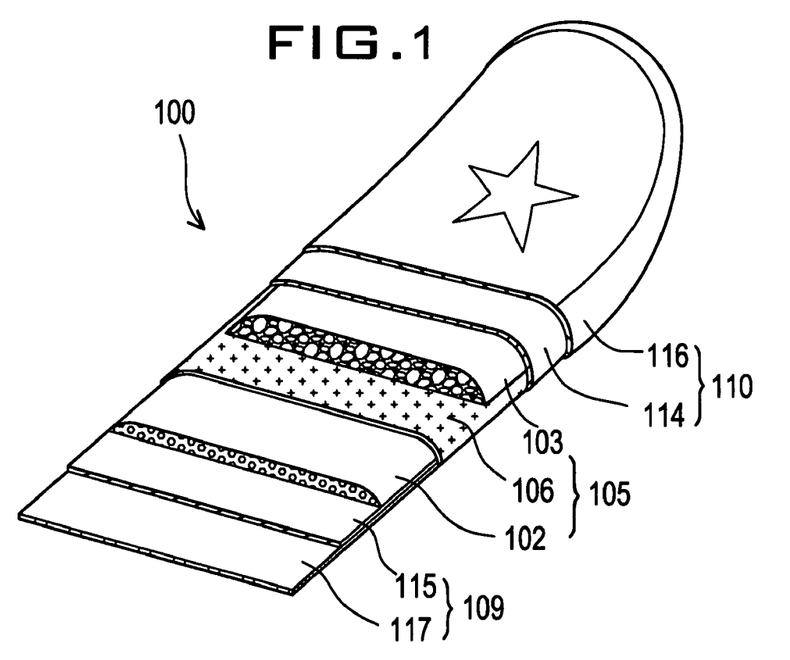
FIG. 1 is a perspective section view of the first embodiment sports board.
Figure 2A:
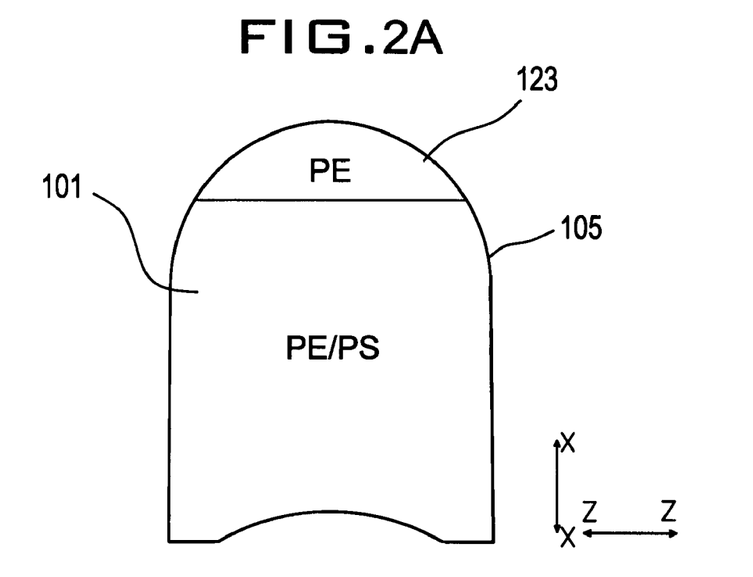
FIG. 2a is a diagram showing assembly of the flexible nose for the first embodiment.
Figure 2B:
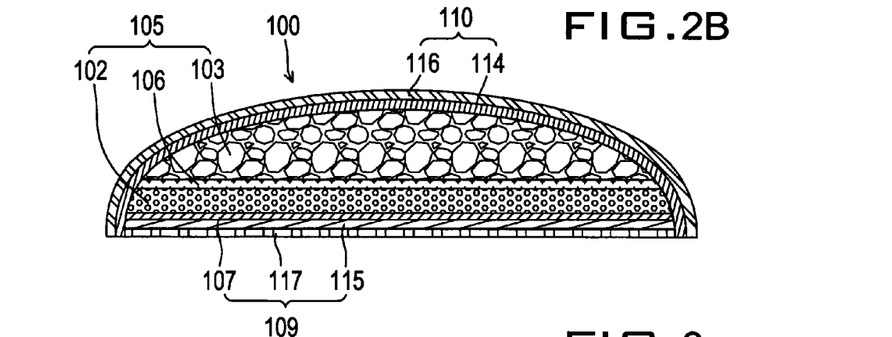
FIG. 2b is a cross-section view of the first embodiment sports board.

Referring to FIGS. 1, 2a, and 2b, the sport board 100 according to the present invention is constructed as a foam sled to ride on a variety of surfaces such as on water waves or snow-covered slopes. The foam sled 100 is an elongated board having a substantially planar main body with round edges and front tip deflected upward. The foam sled includes a polyethylene composite foam core assembly composed of a polyethylene composite foam core 105 which acts as the supporting main body of the board, a front section of low density polyethylene foam 123.

The composite foam core 105 has a top section of low density polyethylene foam 103 and a bottom section of low density polystyrene foam 102. Alternatively, the low density polyethylene foam 103 and a bottom section of low density polystyrene foam 102 can be reversed so that the low density polyethylene foam 103 is below the low density polystyrene foam 102. Preferably, the low density polyethylene foam 103 is above the low density polystyrene foam 102.

A central binding layer 106 is applied to bond the polyethylene foam and polystyrene foam, in which bonding surfaces are oriented in a direction generally parallel to the top surface of the board. The binding layers may be adhesive resin or copolymer foam of polystyrene and polyethylene. The adhesive resin layer may be selected from a group consisting of anhydride-modified ethylene/vinyl acetate, anhydride modified ethylene acrylate, ethylene/propylene copolymer, homogeneous ethylene/alpha-olefin copolymer, anhydride-modified polyolefin, ethylene/acrylic acid copolymer, vinyl acetate/acrylic copolymer, ethylene/methylacrylate copolymer, ethylene/vinyl acetate copolymer, and blends of the foregoing, may be employed. In addition to the central binding layer 106, the polyethylene foam portion 103 and the polystyrene foam portion 102 may be heat bonded together.

The polyethylene foam portion of the core 103 in conjunction with the polystyrene foam portion of the core 102 preferably substantially changes the rigidity of the composite core. The polystyrene foam section 102 of the core preferably has a density of between 1-5.4 pounds per cubic foot (lb/ft$^3$), and with a best mode of 1.5 lb/ft$^3$. The thickness of the polystyrene foam section is preferably between 4 and 50 millimeters (mm), with a best mode of 8 mm. The density of the polyethylene foam section 103 preferably has a density of 1.6 to 6 lb/ft³, with a best mode of 2.2 lb/ft³. The thickness of the polyethylene foam section 103 is preferably 5-72 mm, with a best mode of 18 mm. The adhesive resin central binding layer 106 binds the polyethylene foam section 103 to the polystyrene foam section 102. The adhesive resin central binding layer 106 and lower adhesive resin layer 107 preferably has a density of between 0.88 to 0.99 grams per cubic centimeter (g/cm³) and has a thickness of between 0.02-0.15 mm. The best mode for the thickness of adhesive resin binding layer is 0.07 mm. If the binding layer is copolymer foam of polystyrene and polyethylene, it preferably has a thickness of between 1-6 mm and most preferably 2 mm.

The top skin laminate 110 of sports board 100 comprises a top skin laminate of two layers including a polyethylene foam sheet 114 and a plastic film 116. The bottom skin laminate 109 comprises layer successive laminated plastic layers beginning with adhesive resin layer 107, then a polyethylene foam sheet 115 and a plastic plate on the very bottom 117. The adhesive resin layer 107 retains the polyethylene foam sheet 115 to the foam core. The core is wrapped between polyethylene foam sheet layers including the upper polyethylene foam sheet 114 and the lower polyethylene foam sheet 115. The upper polyethylene foam sheet 114 and the lower polyethylene foam sheet 115 both have a higher density than the composite foam core. Both have a density in the range of 2 to 10 lb/ft³, and preferably a density of about 6 lb/ft³, with a thickness in the range of 2-8 mm, preferably about 3 mm.

Plastic film 116 is a graphically-imprinted polyethylene film. The film may be a single layer or double-layer film. The graphics on layer 116 are imprinted using any of several conventional processes for printing. An example of such a process is corona printing, in which an electrical discharge temporarily alters the surface molecules of the polyethylene film, allowing inks to adhere to the film. Plastic film 116 has a thickness of between 0.03 to 0.3 mm, and preferably a thickness of about 0.14 mm. Layer 116 has a density in the range of 0.91 to 0.98 g/cm³, and preferably a density of about 0.95 g/cm³. The graphic may be printed on the bottom side of the graphically imprinted polyethylene film 116. The graphic may be reversed patterned so that it shows through a clear, transparent or translucent graphically imprinted polyethylene film 116. The graphically imprinted polyethylene film 116 is bonded to the layer below it which is the polyethylene foam sheet 114. The bonding between the graphically imprinted polyethylene film 116 and the polyethylene foam sheet 114 can be by heat bonding, adhesive or the like. Heat bonding using heated rollers is preferable.

A front section 123, FIG. 2a may be made out of the same blank material as the low-density polyethylene foam plates 103 and is heat bonded to the front end of the composite foam core 105 to allow greater nose flexibility for improved impact shock absorption. Thus, in the present embodiment of the invention, the sled 100 provides the dual advantages of high flexural strength against the user's riding load as well as maintaining the desirable shock absorbing property of polyethylene foam in the nose region.

The bottom plastic plate 117 is 0.3-2 mm in thickness with a best mode of 0.5 mm. The bottom plastic plate 117 further has a preferred range of density in the range of 0.91-0.98 g/cm³, with a best mode of 0.95 g/cm³.

Figure 3:
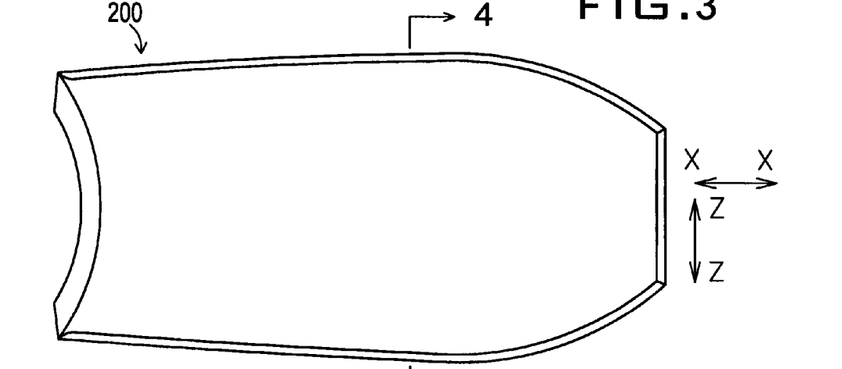
FIG. 3 is a top view of the sports board.
Figure 4:
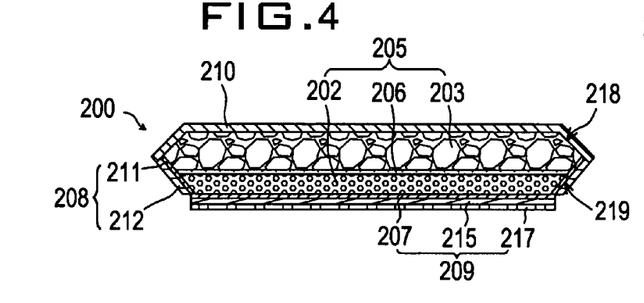
FIG. 4 is a cross-section view of the second embodiment.
Figure 5:
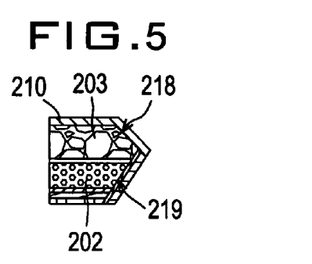
FIG. 5 is a close up view of the cross-section view of the second embodiment

FIGS. 3, 4 and 5 show a second embodiment of the present invention in a bodyboard 200 for surfing or body boarding. The bodyboard 200 is generally a planar board having a bottom surface, a top surface, front surface, tail surface and two side rail surfaces, the board is characterized by having two angularly outwardly extending side rails 218 and 219 also having plastic composition. The composite foam core 205 has the same composition and construction as the composite foam core 105 of the first embodiment. The foam complex 205 also consists of a top section of low density polyethylene foam 203 laminated to a bottom section of low density polystyrene foam 202 through a central binding layer 206. The bottom of the composite foam core further receives an adhesive resin layer 207 adhering an additional polyethylene foam sheet 215 to the bottom of the foam core. The plastic plate 217 similarly adheres to the polyethylene foam sheet 215.

Figure 6:
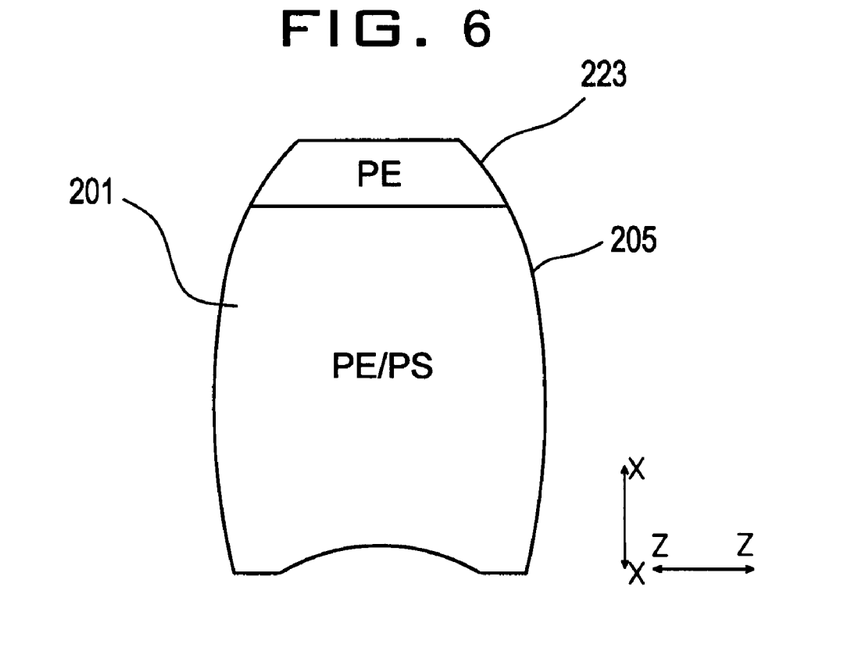
FIG. 6 is a diagram of the nose assembly of a soft nose sports board.

Similar to the first embodiment, a front section 223 also called a nose 223 may be made out of the same blank material as the low density polyethylene foam plate 203 and bonded to the front end of the laminate foam complex 205 to allow greater nose flexibility for improved maneuvering and greater directional control by the rider. The front of nose section 223 is shown as a polyethylene core in FIG. 6. The front nose section may be bonded by adhesive or thermal lamination to the body of the board which is the laminate foam complex 205.

Figure 7:
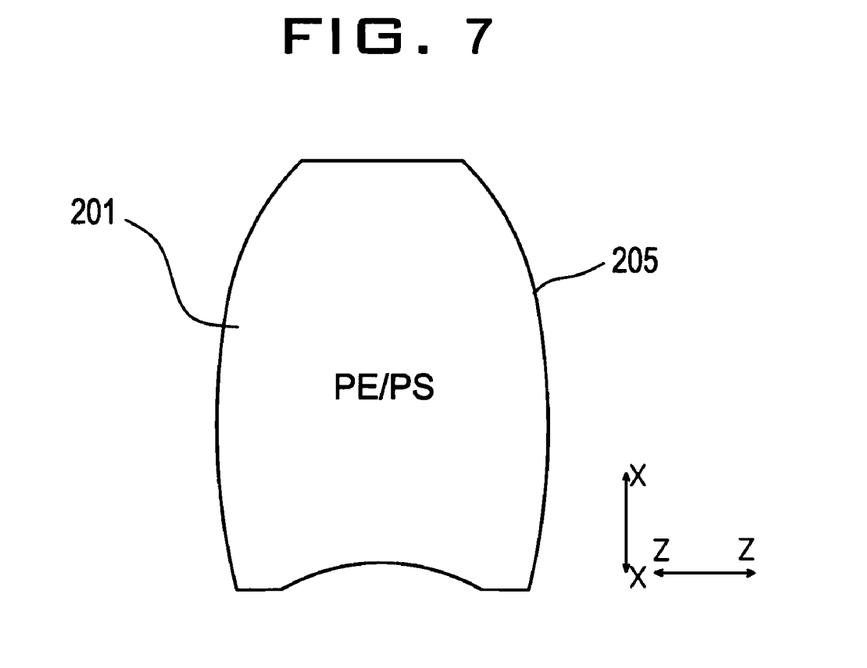
FIG. 7 is a diagram of the nose assembly of a rigid nose sports board.

Alternatively, the stiffening elements 202 may extend throughout the length of the foam core assembly 201 to provide a higher and even stiffness to the entire length of the bodyboard 200. The stiffening element such as the polystyrene foam layer 202 provides greater stiffness as shown in FIG. 7.

The deck layer 210 and lower rail layer 212 are both polyethylene foam. They have a thickness in the range of 2 to 8 mm and preferably of about 4.5 mm and a density in the range of 4 to 10 lb/ft³ and preferably of about 7 lb/ft³. The slick layer 217 is a polyethylene film. Layer 217 has a thickness in the range of 0.3 to 2 mm and preferably of about 0.50 mm and a density in the range of 0.91 to 0.98 g/cm³ and preferably of about 0.95 g/cm³. Layer 215 is polyethylene foam. Layer 215 has a thickness in the range of 2 to 8 mm and preferably of about 3 mm and a density in the range of 2 to 10 lb/ft³ and preferably of about 6 lb/ft³. The low density foam 203 is of polyethylene having a thickness in the range of 5 to 72 mm, preferably of 38 mm. The low density foam 203 has a density in the range of 1.6 to 6 lb/ft³ and preferably of about 2.2 lb/ft³. The low density foam 202 is of polystyrene having a thickness in the range of 4 to 50 mm, preferably of 12 mm. The low density foam 202 has a density in the range of 1 to 5.4 lb/ft³ and preferably of about 1.5 lb/ft³.

Figure 8:
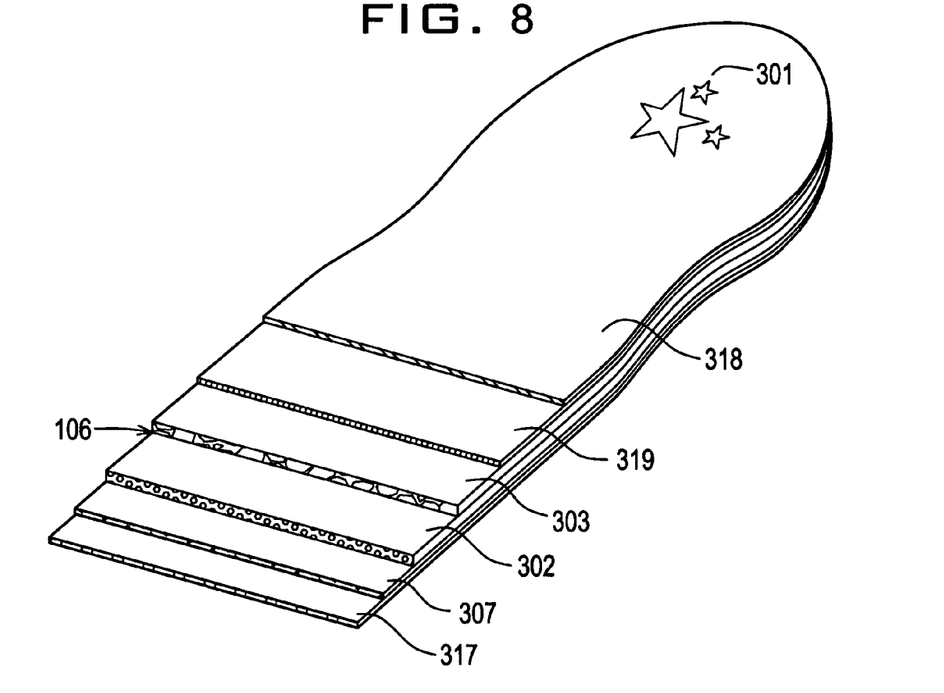
FIG. 8 is a perspective section view of the third embodiment.

The third embodiment 300 of the present invention comprises a foam carpet style stiffening element layer. As seen on FIG. 8, a top printed graphic 301 is printed on the underside of the outside film layer 318 which is backed by inner film 319 or printed on the outside layer of inner film 319. The laminate of the outside film layer 318 and inner film layer 319 is bonded over polyethylene foam sheet 303. The polyethylene foam sheet is adhered or heat bonded over the stiffening layer 302 providing stiffness to the polyethylene foam sheet. Preferably, the adhesive resin central binding layer 106 binds the polyethylene foam section 303 to the polystyrene foam section 302. An adhesive resin layer 307 applied to the underside of the stiffening layer shown as an polystyrene foam sheet 302 provides adhesion between the bottom plastic plate 317 and the polystyrene foam layer 302.

Figure 9:
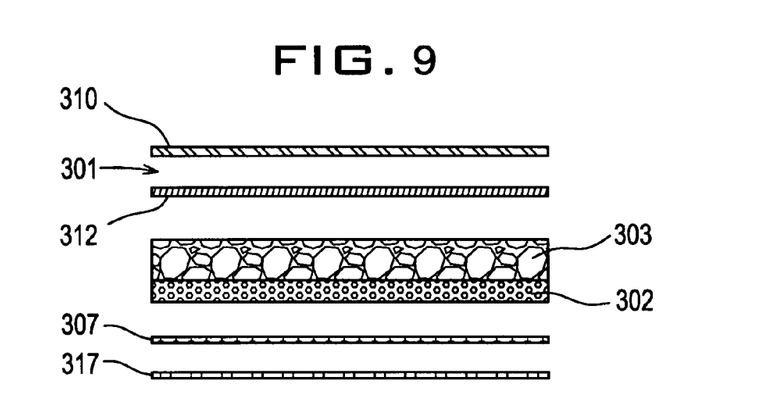
FIG. 9 is a cross sectional view of the third embodiment.

A cross-section is shown in FIG. 9 showing the different layers of the third embodiment. The outer film 318 preferably has a density of 0.91 to 0.98 grams per cubic centimeter with a best mode of 0.95 grams per cubic centimeter. The outer film thickness is preferably between 0.02 and 0.15 mm, with a best mode of 0.07 mm. The inner film 319 has a similar density as the outer film and has a thickness preferably between 0.01 and 0.15 mm, with a best mode of 0.07 mm. The polyethylene foam sheet 303 is preferably between 5 and 45 mm, with a best mode of 14 mm and the polystyrene foam sheet is preferably between 3 and 15 mm, with a best mode of 5 mm. Again, an adhesive resin central binding layer 106 preferably binds the polyethylene foam section 403 to the polystyrene foam section 402.

Figure 10:
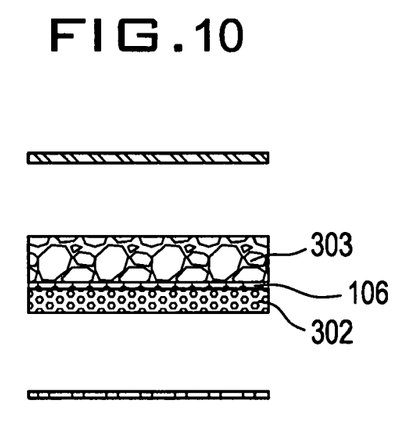
FIG. 10 is a cross-section exploded view assembly diagram of the third embodiment.
Figure 11:
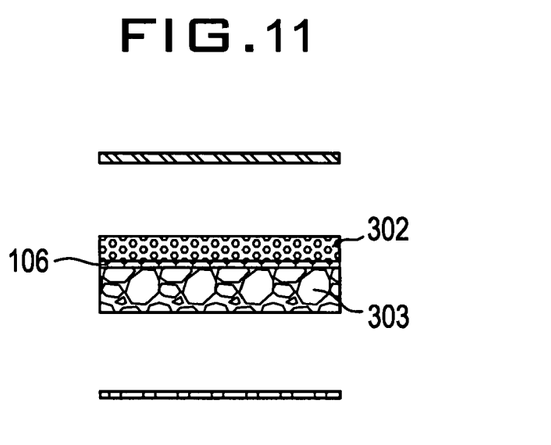
FIG. 11 is a cross-section exploded view assembly diagram of an alternate version of the third embodiment.

The third embodiment can be further modified by reversing the orientation of the sheets. The top plastic skin as shown in FIG. 10 over lies the polyethylene foam sheet which overlies a stiffening element polystyrene foam sheet which overlies a bottom plastic skin. If we turn the board upside down as shown in FIG. 1, the top plastic skin becomes the bottom plastic skin and the bottom plastic skin becomes the top plastic skin. Also, the polystyrene foam layer and the polyethylene foam layer become reversed as shown in FIG. 11. When the expanded polystyrene foam layer 302 is above the polyethylene foam layer 303, the expanded polystyrene foam layer is bonded to the top plastic skin with an adhesive resin layer applied between the expanded polystyrene foam layer 302 and the top plastic skin. Typically, the expanded polystyrene foam layer will have an encapsulating adhesive resin layer so that the expanded polystyrene foam layer can bond to the polyethylene foam core portion 303 and either the top plastic skin, or an overlying backing foam layer.

Figure 12:
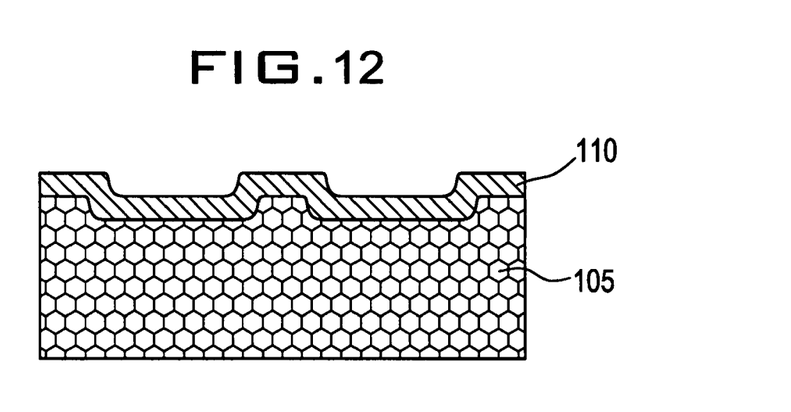
FIG. 12 shows the cross-section profile of embossment pattern.
Figure 13:
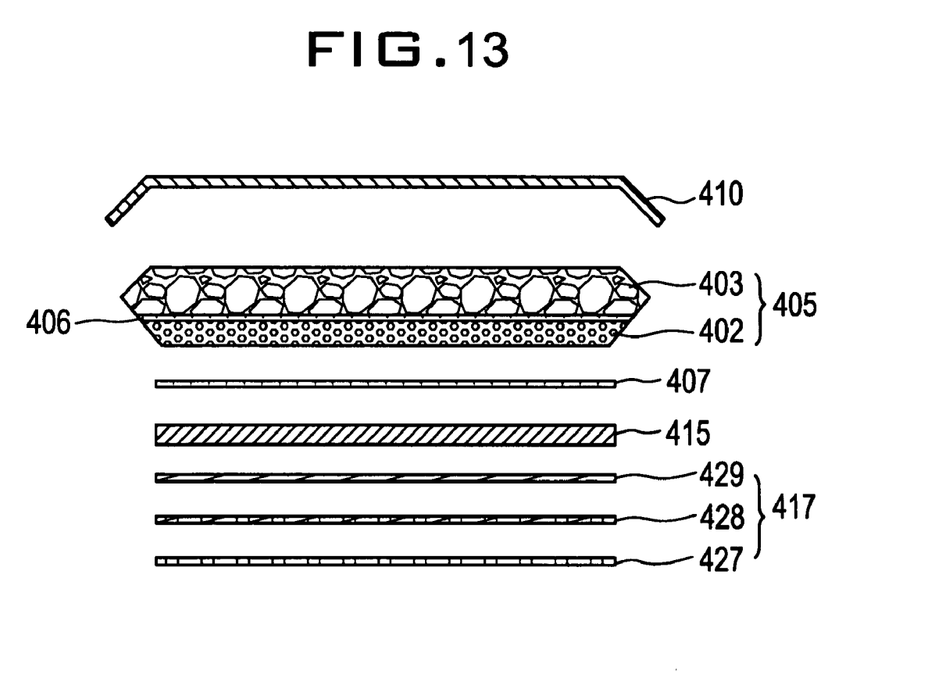
FIG. 13 is a cross-section exploded view assembly diagram of the fourth embodiment.

Furthermore, an embossing pattern can be made on the top plastic layer as shown in FIG. 12. The embossing pattern is preferably a hexagonal oriented matrix of round depressions, which can be applied by a heated profile roller. As shown in FIG. 13, the fourth embodiment 400 of the present invention comprises a polyethylene foam sheet 410, overlying a composite foam core assembly 405 composed of a top section of low density polyethylene foam 403, a central binding layer 406 and a bottom section of low density polystyrene foam 402, overlying an adhesive resin layer 407, overlying a polyolefin foam layer 415, overlying an inner film 429, overlying an outer film 428, overlying a plastic plate 427. A graphic pattern is printed on the outer surface of the inner film or on the inner surface of the outer film and the graphic pattern is visible outside the plastic plate.

Figure 14:
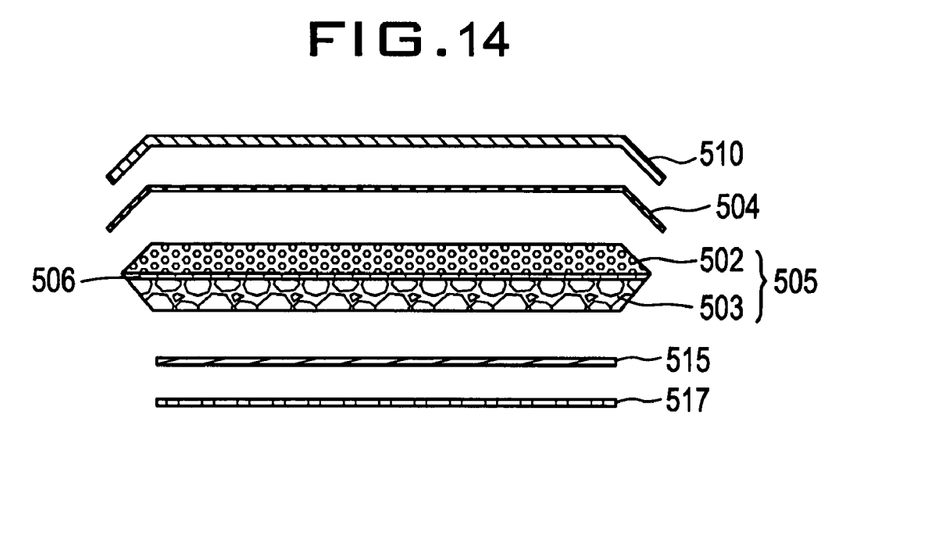
FIG. 14 is a cross-section exploded view assembly diagram of the fifth embodiment.

As shown in FIG. 14, the fifth embodiment 500 of the present invention comprises a polyethylene foam sheet 510, overlying an adhesive resin layer 504, overlying a composite foam core assembly 505 composed of a top section of low density polyethylene foam 502, a central binding layer 506 and a bottom section of low density polystyrene foam 503, overlying a polyethylene foam sheet 515, overlying a plastic plate 517.

Figure 15:
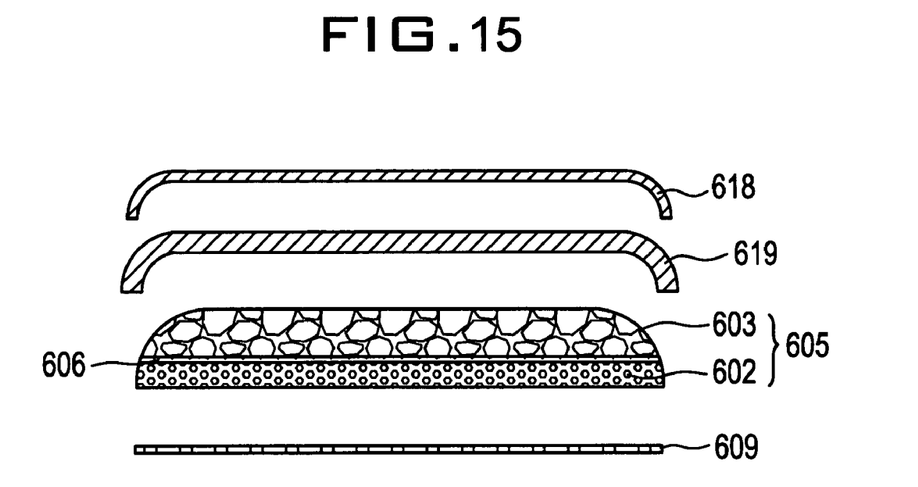
FIG. 15 is a cross-section exploded view assembly diagram of the sixth embodiment.

As shown in FIG. 15, the sixth embodiment 600 of the present invention comprises a top plastic film 618 overlying a polyethylene foam sheet 619, overlying a composite foam core assembly 605 composed of a top section of low density polyethylene foam 603, a central binding layer 606 and a bottom section of low density polystyrene foam 602, overlying a bottom plastic skin 609.

Figure 16:
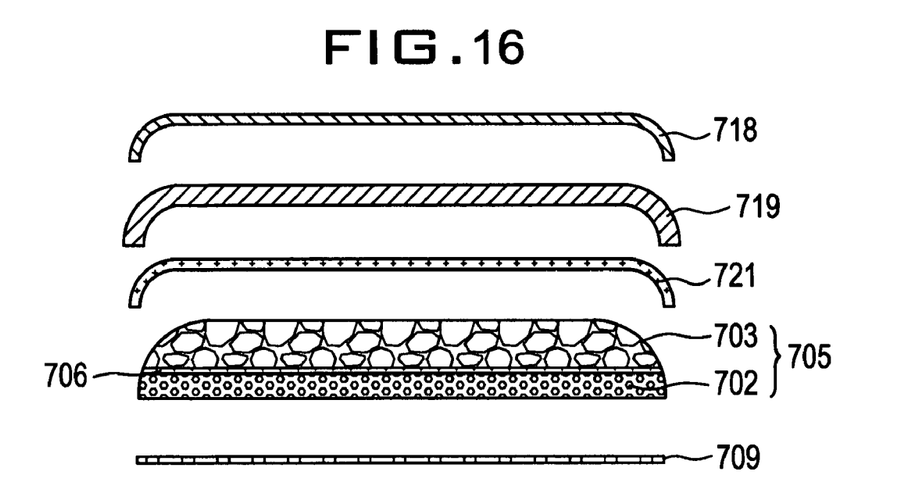
FIG. 16 is a cross-section exploded view assembly diagram of the seventh embodiment.

As shown in FIG. 16, the seventh embodiment 700 of the present invention comprises the same construction of layers as embodiment 600. An additional layer of adhesive resin layer 721 is interposed between the polyethylene foam sheet 719 and the composite foam core assembly 705.

Figure 17:
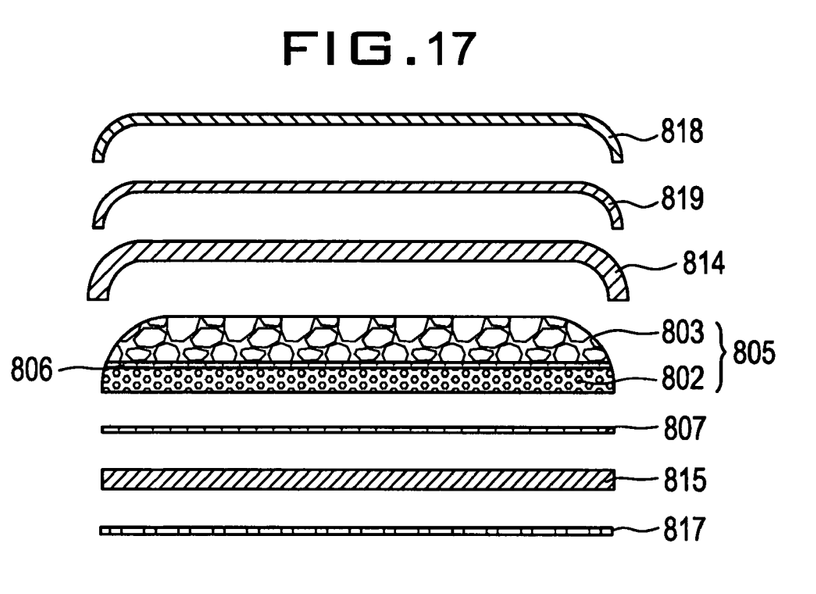
FIG. 17 is a cross-section exploded view assembly diagram of the eighth embodiment.

As shown in FIG. 17, the eighth embodiment 800 of the present invention comprises an outer film 818 overlying an inner film 819. The inner film is bonded to the polyethylene foam sheet 814. The polyethylene foam sheet is bonded to a composite foam core assembly 805 composed of a top section of low density polyethylene foam 802, a central binding layer 806 and a bottom section of low density polystyrene foam 803. The polystyrene foam core bottom portion is overlying an adhesive resin layer 807 which bonds the polystyrene foam core bottom portion 802 to a polyethylene foam sheet 815. The bottom polyethylene foam sheet 815 overlies a plastic plate 817.

Figure 18:
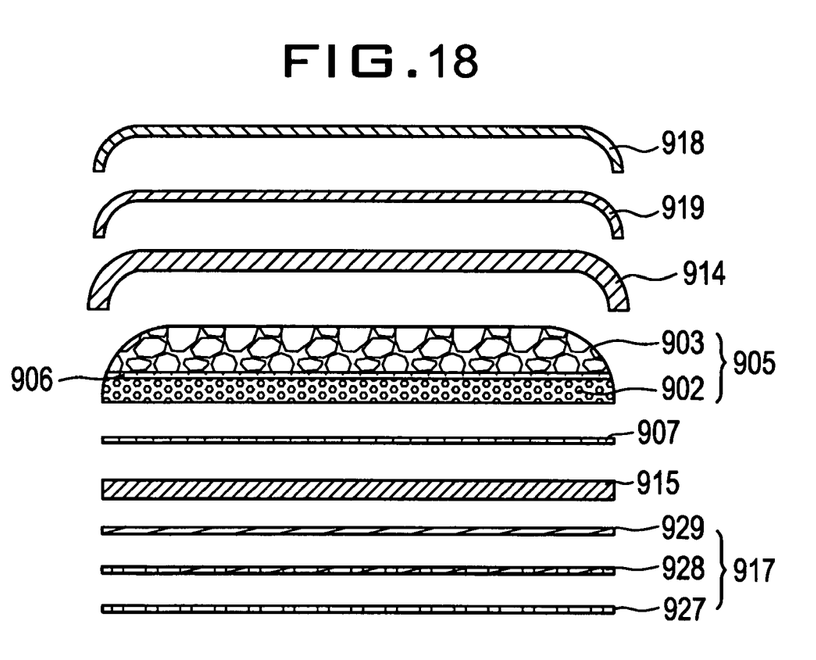
FIG. 18 is a cross-section exploded view assembly diagram of the ninth embodiment.

As shown in FIG. 18, the ninth embodiment 900 of the present invention comprises an outer film 918 bonded to an inner film 919. The inner film 919 overlies a polyethylene foam sheet 914, which overlies a composite foam core assembly 905 composed of a top section of low density polyethylene foam 902, a central binding layer 906 and a bottom section of low density polystyrene foam 903, which overlies a bottom adhesive resin layer 907, which overlies a polyethylene foam sheet 915. The bottom polyethylene foam sheet 915 overlies an inner film 929, which overlies an outer film 928, which overlies a plastic plate 927. A graphic pattern is printed on the outer surface of the inner film or on the inner surface of the outer film and the graphic pattern is visible outside the plastic plate.

Fabrication

Sportsboard 100 is formed in a series of steps. The first step is to make the foam core complex laminate portion 105. A thin coating of adhesive resin is applied to one surface of the polyethylene foam plate by extruding a thin film layer of adhesive resin onto the surface to be bonded with polystyrene foam plate. The resulting laminate is then bonded to the polystyrene foam plate using a conventional heat laminating process. Similarly, a thin coating of adhesive resin is applied to the polyethylene foam sheet side of the polyethylene foam sheet/bottom plastic plate laminate. The resulting laminate is then heat laminated to the polystyrene foam plate of the foam core complex. These laminates are then cut and configured to the desired shape and size. The top skin is then heat laminated to cover the top and edge surface of the composite foam core.

The thickness of the layers can be changed in relation to the type of board that is desired. For example, in the situation of a foam sled a combination of top polyethylene foam section and a bottom polystyrene foam section core is an ideal composite foam core for a snow sled application. The soft and resilient top deck provides a comfortable riding surface with excellent shock absorbing property. The rigid polystyrene bottom core section provides the rigidity for higher sliding speed and directional stability.

In the example of a bodyboard, a regular polystyrene foam core may be too stiff. Straight polyethylene foam core bodyboard has the drawback of insufficient rigidity and is heavier than a polystyrene foam core bodyboard. A hybrid foam core of polystyrene foam and polyethylene foam make the board more rigid and less weight than a polyethylene foam core board. At the same time the polyethylene foam section of the composite core responses better with the rider's bending force due to the better elasticity of the polyethylene foam section.

Generally, fabrication by heat laminating or adhesive resin bonding of various layers of plastic film and film is well known in the art. A variety of references show construction techniques for assembling a sports board having a backing foam layer. Szabad U.S. Pat. No. 4,850,913 incorporated herein by reference teaches how to make a foam board with both the top and bottom surface completely covered by a laminate PE film and PE foam sheet. Also a variety of references shows use of graphic film on a sports board. A variety of references show use of dual layer graphic film on a foam core such as Schneider U.S. Pat. No. 5,211,593 incorporated herein by reference which teaches a polyethylene foam core.

Therefore, while the presently preferred forms of the sports board and its derivative have been shown and described, and several modifications thereof discussed, persons skilled in this art will readily appreciate that various additional changes and modifications may be made without departing from the spirit of the invention, as defined and differentiated by the following claims. For example, the sports board of the first embodiment may have its bottom plastic plate replaced by the multi-layer bottom plastic plate of the board.

The invention claimed is:

1. A sports board comprising:
   a. a laminated composite foam core comprising a polyolefin foam base and a stiffening element layer, having a top surface, a bottom surface, and side edge surfaces; the sports board having a leading end; wherein the stiffening element comprises of a vertically compressible substantially polyolefin foam for providing flexibility and resiliency to the sports board, wherein the stiffening element has flexural strength higher than the low-density polyolefin foam base and provides mechanical stiffening to the sports board; and wherein the composite foam core is composed of two different foam materials bonded together in a plane generally parallel to the plane of the core;
   b. a top plastic layer laminated to the top surface and side edge surfaces of the composite foam core, comprised of an outer film and an inner film, wherein the outer film is a single layer graphic film with a graphic printed on an inner surface of the outer film and wherein the inner film is an adhesive resin layer, said outer film forms the outmost layer of the sports board, wherein the graphic appears through the outer film
   c. a bottom plastic layer laminated to the bottom surface of the composite foam core.

2. The sports board set forth in claim 1, wherein the stiffening element layer is polystyrene foam sheet and the polyolefin foam base is polyethylene foam, wherein an adhesive resin layer bonds the polyethylene foam portion to the polystyrene foam sheet.

3. The sports board as set forth in claim 2, wherein the top layer has concave embossments.

4. The sports board set forth in claim 2, further comprising a bottom adhesive resin layer bonding the bottom plastic layer to the stiffening element layer.

5. The sports board set forth in claim 2, further comprising a top adhesive resin layer bonding the inner film to the stiffening element layer.

6. The sports board of claim 2, further including an integral end section of thermoplastic polyolefin foam bonded to the laminated composite foam core to form the leading end, wherein a bonding surface is generally perpendicular to the top surface of the sports board.

7. A sports board comprising:
   a. a laminated composite foam core comprising a polyethylene foam top portion and a polystyrene stiffening element bottom layer, having a top surface, a bottom surface, and side edge surfaces; the sports board having a leading end, wherein the polyethylene foam top portion has a thickness in the range of 5-72 mm, wherein the stiffening element having a first bonding surface and second bonding surface, wherein the second surface is bonded to the polyethylene foam top portion and oriented in a direction generally parallel to the plane of the core, wherein the stiffening element comprises a vertically compressible polystyrene foam for providing flexibility and resiliency to the sports board, wherein the stiffening element comprises polystyrene foam with flexural strength higher than the polyethylene foam top portion and provides mechanical stiffening to the sports board, wherein the polystyrene foam portion has a thickness less than the thickness of the polyethylene foam portion and in the range of 3-50 mm;
   b. a top polyethylene foam sheet being bonded to the top surface and side edge surfaces of the composite foam core, wherein the polyethylene foam sheet has a higher density than the composite foam core; and
   c. a bottom plastic layer laminated to the bottom surface of the composite foam core.

8. The sports board of claim 7, wherein said bottom plastic layer comprising:
   a. a bottom adhesive resin layer having an outer surface and inner surface, said inner surface being bonded to the first surface of polystyrene foam layer;
   b. a bottom polyethylene foam sheet having an outer surface and inner surface, said inner surface being bonded to the outer surface of the bottom adhesive resin;
   c. a plastic plate being bonded to the outer surface of the bottom polyethylene foam sheet.

9. The sports board of claim 8, wherein the plastic plate further comprises a bottom inner film, a bottom outer film and a plastic plate; wherein the outer film is a single layer graphic film with a graphic printed on an inner surface of the outer film and wherein the inner film is an adhesive resin layer, wherein the graphic appears through outer film and through the plastic plate.

10. The sports board of claim 7, further including an integral end section of thermoplastic polyolefin foam bonded to the laminated composite foam core to form the leading end, wherein a bonding surface is generally perpendicular to the top surface of the sports board.

11. The sports board of claim 7, wherein an adhesive resin layer bonds the polyethylene foam top portion to the polystyrene stiffening element bottom layer.

12. The sports board of claim 7, further comprising a second adhesive resin layer bonding the top polyethylene foam sheet to the top surface and side edge surfaces of the composite foam core.

13. A sports board comprising:
   a. a laminated composite foam core comprising a polyethylene foam bottom portion, having first bonding surface and second bonding surface, and a polystyrene stiffening element top layer, having a top surface, a bottom surface, and side edge surfaces; the sports board having a leading end, wherein the polyethylene foam bottom portion has a thickness in the range of 5-72 mm, wherein the stiffening element having a first bonding surface and second bonding surface, wherein the first surface is bonded to the second surface of the polyethylene foam bottom portion and oriented in a direction generally parallel to the plane of the core, said stiffening element is vertically compressible for providing flexibility and resiliency to the sports board; wherein the stiffening element comprises polystyrene foam with flexural strength higher than the polyethylene foam bottom portion and provides mechanical stiffening to the sports board, wherein the polystyrene foam portion has a thickness less than the thickness of the polyethylene foam portion and in the range of 3-50 mm;
   b. a top plastic layer comprised of:
      a top plastic film comprising a top outer film and a top inner film, wherein the outer film is a single layer graphic film with a graphic printed on an inner surface of the outer film and wherein the inner film is an adhesive resin layer, said outer film forms the outmost layer of the sports board, wherein the graphic appears through the outer film;

a top polyethylene foam sheet having an outer surface and an inner surface, said outer surface being bonded to the inner film, wherein the polyethylene foam sheet has a higher density than the composite foam core;

a second adhesive resin layer having an outer surface and an inner surface, said outer surface being bonded to the inner surface of the polyethylene foam sheet and said inner surface being bonded to the top surface and side edge surfaces of the composite foam core; and c. a bottom plastic layer laminated to the bottom surface of the composite foam core.

14. The sports board of claim 13, wherein the bottom plastic layer further comprises:

a. a bottom polyethylene foam sheet having an outer surface and inner surface, said inner surface being bonded to the first surface of said polyethylene foam bottom portion;

b. a bottom plastic film comprising a bottom outer film and a bottom inner film, wherein the outer film is a single layer graphic film with a second graphic printed on an inner surface of the outer film and wherein the inner film is an adhesive resin layer, said inner film being bonded to the outer surface of the bottom polyethylene foam sheet; and c. a plastic plate being bonded to the bottom outer film, wherein said second graphic appears through the bottom outer film and the plastic plate.

15. A sports board comprising:

a. a laminated composite foam core comprising a polyethylene foam top portion and a polystyrene stiffening element bottom layer, having a top surface, a bottom surface, and side edge surfaces; the sports board having a leading end, wherein the polyethylene foam top portion has a thickness in the range of 5-72 mm, wherein the stiffening element having a first bonding surface and second bonding surface, wherein the second surface is bonded to the polyethylene foam top portion and oriented in a direction generally parallel to the plane of the core, wherein the stiffening element comprises a vertically compressible polystyrene foam for providing flexibility and resiliency to the sports board, and has flexural strength higher than the polyethylene foam top portion for providing mechanical stiffening to the sports board, wherein the polystyrene foam portion has a thickness less than the thickness of the polyethylene foam portion and in the range of 3-50 mm;

b. a top plastic layer laminated to the top surface and side edge surfaces of the composite foam core, comprised of an outer film and an inner film, wherein the outer film is a single layer graphic film with a graphic printed on an inner surface of the outer film and wherein the inner film is an adhesive resin layer, said outer film forms the outmost layer of the sports board, wherein the graphic appears through the outer film, c. a bottom plastic layer laminated to the bottom surface of the composite foam core.

16. The sports board of claim 15, wherein said bottom plastic layer comprising:

a. a bottom adhesive resin having an outer surface and inner surface, said inner surface being bonded to the first surface of polystyrene foam layer;

b. a bottom polyethylene foam sheet having an outer surface and inner surface, said inner surface being bonded to the outer surface of the bottom adhesive resin layer;

c. a plastic plate being bonded to the outer surface of the bottom polyethylene foam sheet.

17. The sports board of claim 16, wherein the plastic plate further comprises a bottom inner film, a bottom outer film and a plastic plate; wherein the outer film is a single layer graphic film with a second graphic printed on an inner surface of the outer film and wherein the inner film is an adhesive resin layer, wherein the second graphic appears through the outer film and through the plastic plate.

18. The sports board of claim 15, wherein an adhesive resin layer bonds the polyethylene foam top portion to the polystyrene stiffening element bottom layer.

19. The sports board of claim 15, further including an integral end section of thermoplastic polyolefin foam bonded to the laminated composite foam core to form the leading end, wherein a bonding surface is generally perpendicular to the top surface of the sports board.

20. The sports board of claim 15, wherein the top outer film is a polyethylene film having a thickness of between 0.02 mm up to 0.15 mm, wherein the top inner film has a thickness of between 0.01 mm up to 0.15 mm, wherein the top surface of the top outer film, and the top surface of the top inner film have concave embossments.

21. A sports board comprising:

a. a laminated composite foam core comprising a polyethylene foam top portion and a polystyrene stiffening element bottom layer, having a top surface, a bottom surface, and side edge surfaces; the sports board having a leading end, wherein the polyethylene foam top portion has a density in the range of 1.6 to 6 lb/ft$^3$, wherein the stiffening element having a first bonding surface and second bonding surface, wherein the second surface is bonded to the polyethylene foam top portion and oriented in a direction generally parallel to the plane of the core, wherein the stiffening element comprises a vertically compressible polystyrene foam for providing flexibility and resiliency to the sports board, wherein the stiffening element comprises polystyrene foam with flexural strength higher than the polyethylene foam top portion and provides mechanical stiffening to the sports board, wherein the polystyrene foam portion has a density less than the density of the polyethylene foam portion and in the range of 1 to 5.4 lb/ft$^3$;

b. a top plastic layer comprised of:

a top plastic film comprising a top outer film and a top inner film, wherein the outer film is a single layer graphic film with a graphic printed on an inner surface of the outer film and wherein the inner film is an adhesive layer, said outer film forms the outermost layer of the sports board, wherein the graphic appear through the outer film:

a top polyethylene foam sheet having an outer surface and an inner surface, wherein the polyethylene foam sheet has a higher density than the composite foam core, said outer surface being bonded to the inner film and said inner surface being bonded to the top surface and side edge surfaces of the composite foam core; and c. a bottom plastic layer laminated to the bottom surface of the composite foam core.

22. The sports board of claim 21, wherein said bottom plastic layer comprising:

a. a bottom adhesive resin layer having an outer surface and inner surface, said inner surface being bonded to the first surface of polystyrene foam layer;

b. a bottom polyethylene foam sheet having an outer surface and inner surface, said inner surface being bonded to the outer surface of the bottom adhesive resin;

c. a plastic plate being bonded to the outer surface of the bottom polyethylene foam sheet.

23. The sports board of claim 22, wherein the plastic plate further comprises a bottom inner film, a bottom outer film and a plastic plate, wherein the outer film is a single layer graphic film with a graphic printed on an inner surface of the outer film and wherein the inner film is an adhesive resin layer, wherein the graphic appears through outer film and through the plastic plate.

24. The sports board of claim 21, wherein an adhesive resin layer bonds the polyethylene foam top portion to the polystyrene stiffening element bottom layer.

25. The sports board of claim 21, further including an integral end section of thermoplastic polyolefin foam bonded to the laminated composite foam core to form the leading end, wherein a bonding surface is generally perpendicular to the top surface of the sports board.

26. The sports board of claim 21, wherein the top outer film is a polyethylene film having a thickness of between 0.02 mm up to 0.15 mm, wherein the top inner film has a thickness of between 0.01 mm up to 0.15 mm, wherein the top surface of the top outer film, and the top surface of the top inner film have concave embossments.

27. The sports board of claim 21, further comprising a second adhesive resin layer bonding the top polyethylene foam sheet to the top surface and side edge surfaces of the composite foam core.

* * * * *